United States Patent
Cheng et al.

(10) Patent No.: US 9,116,573 B2
(45) Date of Patent: Aug. 25, 2015

(54) VIRTUAL CONTROL DEVICE

(71) Applicant: Quanta Computer Inc., Kuei Shan Hsiang, Tao Yuan Shien (TW)

(72) Inventors: Chih-Chi Cheng, Tao Yuan Shien (TW); Chee-Chun Leung, Tao Yuan Shien (TW); Wei-Min Chao, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 143 days.

(21) Appl. No.: 14/028,716

(22) Filed: Sep. 17, 2013

(65) Prior Publication Data

US 2014/0253509 A1    Sep. 11, 2014

(30) Foreign Application Priority Data

Mar. 5, 2013    (TW) .............................. 102107572 A

(51) Int. Cl.
*G06F 3/042* (2006.01)

(52) U.S. Cl.
CPC .............. *G06F 3/042* (2013.01); *G06F 3/0425* (2013.01); *G06F 3/0428* (2013.01)

(58) Field of Classification Search
CPC ......... G06F 3/017; G06F 3/041; G06F 3/042; G06F 3/0426
USPC .................................................. 345/173, 175
See application file for complete search history.

(56) References Cited

U.S. PATENT DOCUMENTS

2010/0207912 A1\* 8/2010 Wu et al. ....................... 345/175
2014/0267174 A1  9/2014 Lin et al.

FOREIGN PATENT DOCUMENTS

TW          201145088          12/2011

OTHER PUBLICATIONS

Taiwanese language office action dated Feb. 11, 2015.
English language translation of abstract of TW 201145088 (published Dec. 16, 2011).

\* cited by examiner

*Primary Examiner* — Kathy Wang-Hurst
*Assistant Examiner* — David Tung
(74) *Attorney, Agent, or Firm* — McClure, Qualey & Rodack, LLP

(57) ABSTRACT

A virtual control device is provided for an electronic device. The virtual control device includes a first lens, a second lens, a first photosensitive unit, a second photosensitive unit and a processor unit. The first photosensitive unit is arranged behind the first lens by a focal length, and obtains a first image via the first lens. The second photosensitive unit is arranged behind the second lens by the focal length, and obtains a second image via the second lens. The processor unit determines the object-position coordinates of a virtual control plane according to a first position of the projection of the object on the first photosensitive unit and a second position of the projection of the object on the second photosensitive unit, and the processor unit provides the object-position coordinates to the electronic device.

9 Claims, 4 Drawing Sheets

VIRTUAL CONTROL DEVICE

CROSS REFERENCE TO RELATED APPLICATIONS

This Application claims priority of Taiwan Patent Application No. 102107572, filed on Mar. 5, 2013, the entirety of which is incorporated by reference herein.

TECHNICAL FIELD

The invention relates to virtual devices, and more particularly to virtual devices provided to be an input interface of an electrical device.

BACKGROUND

Input interfaces in conventional electronic devices can be a keyboard, mouse, touch panel and other physical devices for the user to operate, but with advances in image-recognition technology, some electronic devices can use the camera to recognize a user's gestures or actions, and perform a corresponding operation. However, the computations required to operate such image recognition is quite heavy, and the reaction time of the electronic devices is usually not quick enough.

In addition, most gesture-control applications capture images via the camera on the electronic device, such as the camera on the top of the notebook display. However, the camera is set at a normal angle, and the image detection range of the camera is quite limited. Therefore, it is difficult to determine the user's gestures when the gesturing of the user is close to the electronic device.

SUMMARY

An embodiment of a virtual control device for an electronic device, comprising: a first lens; a second lens; a first photosensitive unit, arranged behind the first lens by a focal length, and obtaining a first image via the first lens; a second photosensitive unit, arranged behind the second lens by the focal length, and obtaining a second image via the second lens; and a processor unit, determining the object-position coordinates of a virtual control plane according to the first image and the second image, and providing the object-position coordinates to the electronic device, wherein the extension plane of the virtual control plane intersects the center of the first lens and the center of the second lens, and the processor unit determines the object-position coordinates according to a first position of the projection of the object on the first photosensitive unit and a second position of the projection of the object on the second photosensitive unit.

BRIEF DESCRIPTION OF DRAWINGS

The invention will become more fully understood by referring to the following detailed description with reference to the accompanying drawings, wherein.

DESCRIPTION OF EMBODIMENTS

The making and use of the embodiments of the present invention are discussed in detail below. It should be appreciated, however, that the embodiments provide many applicable inventive concepts that can be embodied in a wide variety of specific contexts. The specific embodiments discussed are merely illustrative of specific ways to make and use the invention, and do not limit the scope of the invention.

Figure 1:
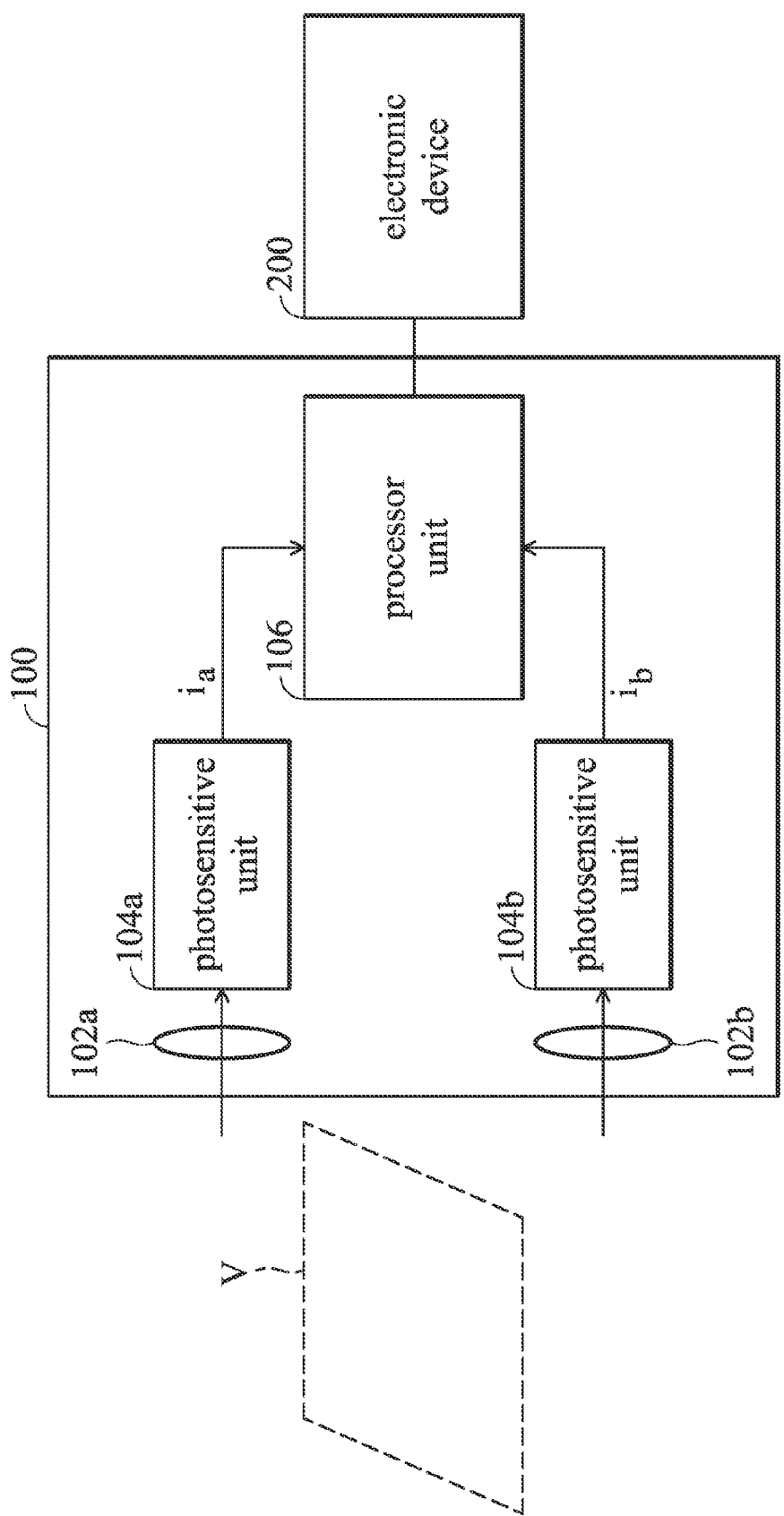
FIG. 1 is a block diagram illustrating an embodiment of a virtual control device according to the invention.

FIG. 1 is a block diagram illustrating an embodiment of a virtual control device. The virtual control device 100 may be an input interface for an electronic device 200, such as a computer, notebook, or tablet computer. For example, if the electronic device 200 is a notebook, the virtual control device 100 can be used for detecting the position of a user's finger on a virtual control plane V, and transmitting the obtained position to the electronic device 200, so that the virtual control plane V can replace the touch panel to serve as a control interface for controlling the mouse cursor. The virtual control device 100 comprises a lens 102a, a lens 102b, a photosensitive unit 104a, a photosensitive unit 104b and a processor unit 106.

The lens 102a is arranged in front of the photosensitive unit 104a, the photosensitive unit 104a receives an image $i_a$ via the lens 102a, and the photosensitive unit 104a transmits the image $i_a$ to the processor unit 106. Similarly, the lens 102b is arranged in front of the photosensitive unit 104b, the photosensitive unit 104b receives an image $i_b$ via the lens 102b, and the photosensitive unit 104b transmits the image $i_b$ to the processor unit 106. The processor unit 106 determines the selected position (selected by the user) on the virtual control plane V according to the image $i_a$ and the image $i_b$, and transmits the selected position to the electronic device 200. It will be described with FIGS. 2 and 3 in detail below.

Figure 2:
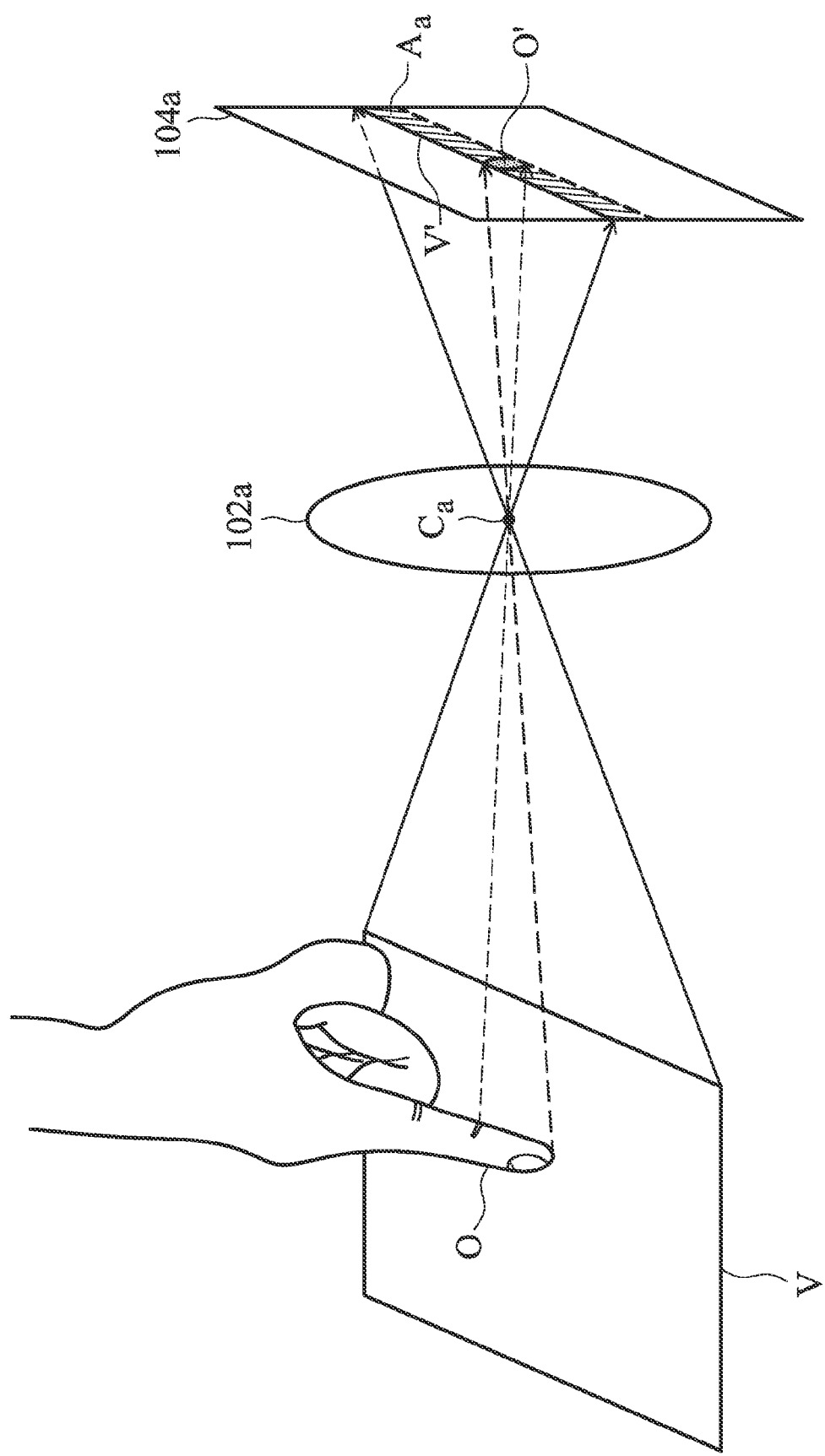
FIG. 2 is a diagram showing an embodiment of the photosensitive unit capturing the images via the lens according to the invention.
Figure 3:
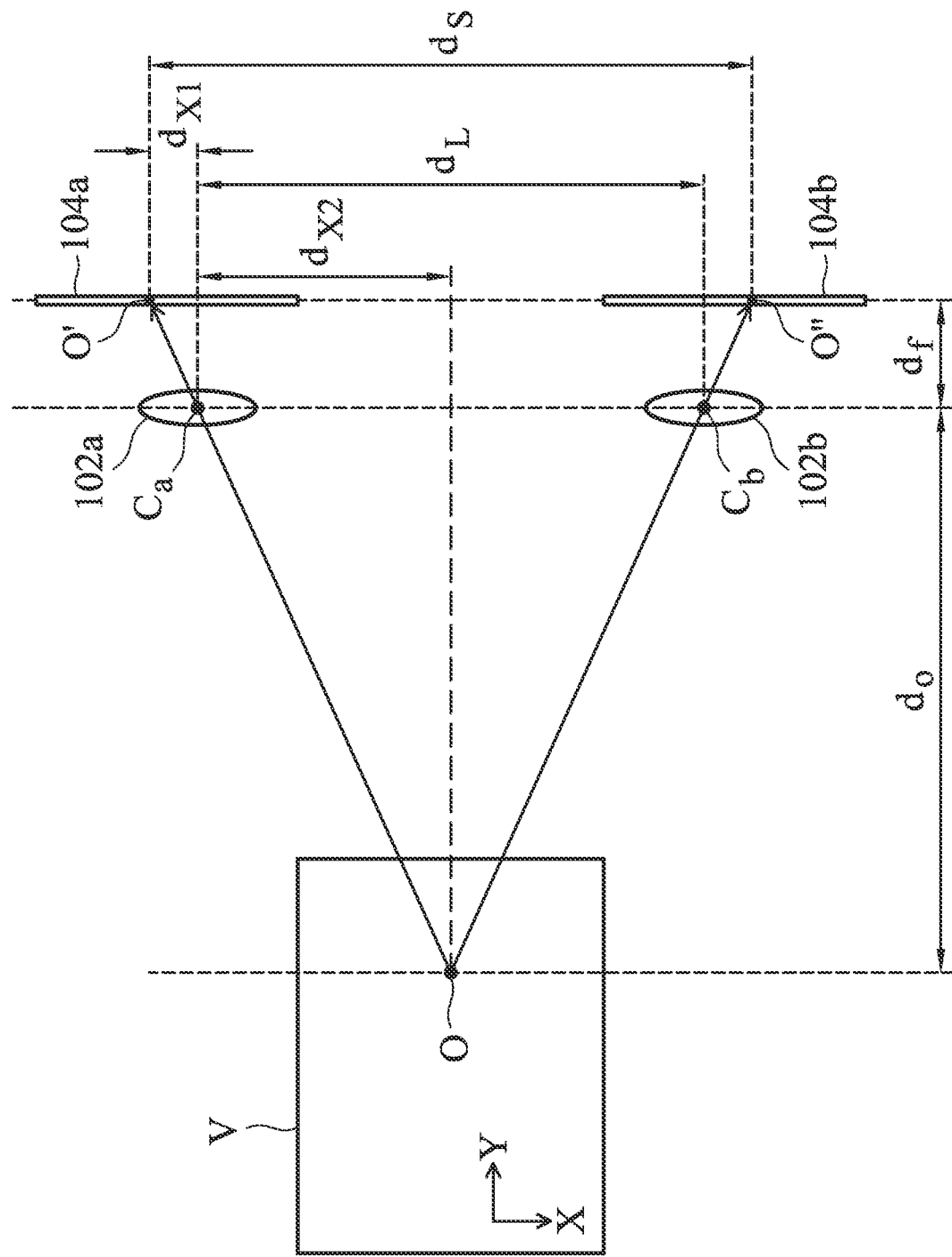
FIG. 3 is a vertical view showing an embodiment of the photosensitive unit capturing the images via lens according to the invention.

FIG. 2 is a diagram showing an embodiment of the photosensitive unit capturing the images via the lens according to the invention, and FIG. 3 is a vertical view showing an embodiment of the photosensitive unit capturing the images via the lens according to the invention. As shown in FIG. 2, the extension of the virtual control plane V intersects the lens-center $C_a$ (the center of aperture) of the lens 102a, so the projection V' shown on the photosensitive unit 104b is a straight line, wherein the projection V' is the projection of the virtual control plane V on the photosensitive unit 104b via the lens 102a. Similarly, the overlap of an object O (ex. user's finger or touch pen) and virtual control plane V will be projected within the projection V', so that the processor unit 106 can determine the position of the projection of the object O on the photosensitive unit 104a according to the projection V' on the image $i_a$ captured by the photosensitive unit 104a. For example, the processor unit 106 can determine the position of the projection of the object O on the photosensitive unit 104a by comparing the pre-stored projection image of the object O with the projection V' on the image $i_a$. If the pre-stored projection image of the object O matches a section of the projection V' on the image $i_a$, it means the object O is projected in the position of the section. It should be noted that, if the lens 102a is formed by multiple lenses, the extension of the virtual control plane V intersects the equivalent lens-center of the multiple lenses.

In some embodiments, in order to determine the accurate position of the projection O' of the object O on the photosensitive unit 104a, the processor unit 106 can determine the position of the projection O' of the object O on the photosensitive unit 104a according to the block Aa on the image $i_a$ captured by the photosensitive unit 104a. For example, the processor unit 106 can determine the position of the projection O' of the object O on the photosensitive unit 104a by comparing the pre-stored projection image of the object O with the block Aa on the image ia. Also, the extension of the virtual control plane V intersects the lens-center $C_b$ (the center of aperture) of the lens 102b, so the operations of the lens 102b and the photosensitive unit 104b are similar to the operations of the lens 102a and the photosensitive unit 104a, and the position of the projection O" of the object O on the photosensitive unit 104b can be obtained, and the details are omitted here for brevity. It should be noted that, because the processor unit 106 can determine the position of the object projection O' by comparing the projection image of the object O only with the block Aa, the computations of image processing by the processor unit 106 is reduced. Also, if the lens 102b is formed by multiple lenses, the extension of the virtual control plane V intersects the equivalent lens-center of the multiple lenses.

Next, the present invention is described with FIG. 3. As shown in FIG. 3, the lens 102a and the lens 102b are arranged on the same plane, the lens-center $C_a$ of the lens 102a and the lens-center $C_b$ of the lens 102b are separated by a lens interval $d_L$. On the other hand, the photosensitive unit 104a is arranged behind the lens 102a by a focal length $d_f$, the photosensitive unit 104b is arranged behind the lens 102b by a focal length $d_f$, and the photosensitive unit 104a and the photosensitive unit 104b are set in the same plane (the dotted line along 104a and 104b).

In the embodiment of FIG. 2, the processor unit 106 can obtain the position of the projections of the object O on the photosensitive unit 104a and the photosensitive unit 104b. Therefore, the processor unit 106 can determine the projection interval $d_s$ according to the positions of the projections of the object O on the photosensitive unit 104a and the photosensitive unit 104b. For example, the processor unit 106 may pre-store related position information (such as the interval value) between the photosensitive unit 104a and the photosensitive unit 104b. When the processor unit 106 has obtained the positions of the projections of the object O on the photosensitive unit 104a and the photosensitive unit 104b, the projection interval $d_s$ can be calculated accordingly.

Next, in order to obtain the position of the object O on the virtual control plane V, the processor unit 106 may preset the values of the lens interval $d_L$ and the focal length $d_f$. After the projection interval $d_s$ is calculated by the processor unit 106, the depth value of the object O can be obtained according to the expression $d_O=d_f \cdot d_L/(d_L-d_S)$, which is derived from the proportion of object distance $d_O$: lens interval $d_L$=(object distance $d_O$+focal length $d_f$): projection interval $d_S$. The depth value of the object O represents the object distance $d_O$ between the object O and the plane which the lens 102a and the lens 102b are arranged on.

After the object distance $d_O$ is calculated by the processor unit 106, the processor unit 106 further calculates the Y-coordinate value of the object O on the virtual control plane V, and transmits the Y-coordinate value of the object O to the electronic device 200. It should be noted that, in the embodiment, the Y-coordinate value may be a relative coordinate value. Based on the disclosure of the embodiment, one skilled in the art can select a point on the virtual control plane V as the origin point, and determines the Y-coordinate value of the object O on the virtual control plane V according to the distance between the object O and the selected origin point.

In some embodiments, the processor unit 106 may pre-store the projection position of the lens-center $C_a$ of the lens 102a on the photosensitive unit 104a, so that the processor unit 106 can determine the distance $d_{X1}$ between the projection of the lens-center $C_a$ of the lens 102a and the object projection O' on the photosensitive unit 104a. After the object distance $d_O$ and the distance $d_{X1}$ are calculated by the processor unit 106, the distance $d_{X2}$ between the projection of the object O on the plane (which the lens 102a and the lens 102b are arranged on) and the projection of the lens-center $C_a$ on the photosensitive unit 104a can be obtained according to the expression $d_{X2}=d_O \cdot d_{X1}/d_f$, which is derived from the proportion of distance $d_{X1}$: focal length $d_f$=distance $d_{X2}$: object distance $d_O$. The distance $d_{X2}$ represents the X-coordinate value on the virtual control plane V. It should be noted that, in the embodiment, the X-coordinate value may be a relative coordinate value. Based on the disclosure of the embodiment, one skilled in the art can select a point on the virtual control plane V as the origin point, and determine the X-coordinate value of the object O on the virtual control plane V according to the distance between the object O and the selected origin point.

Figure 4:
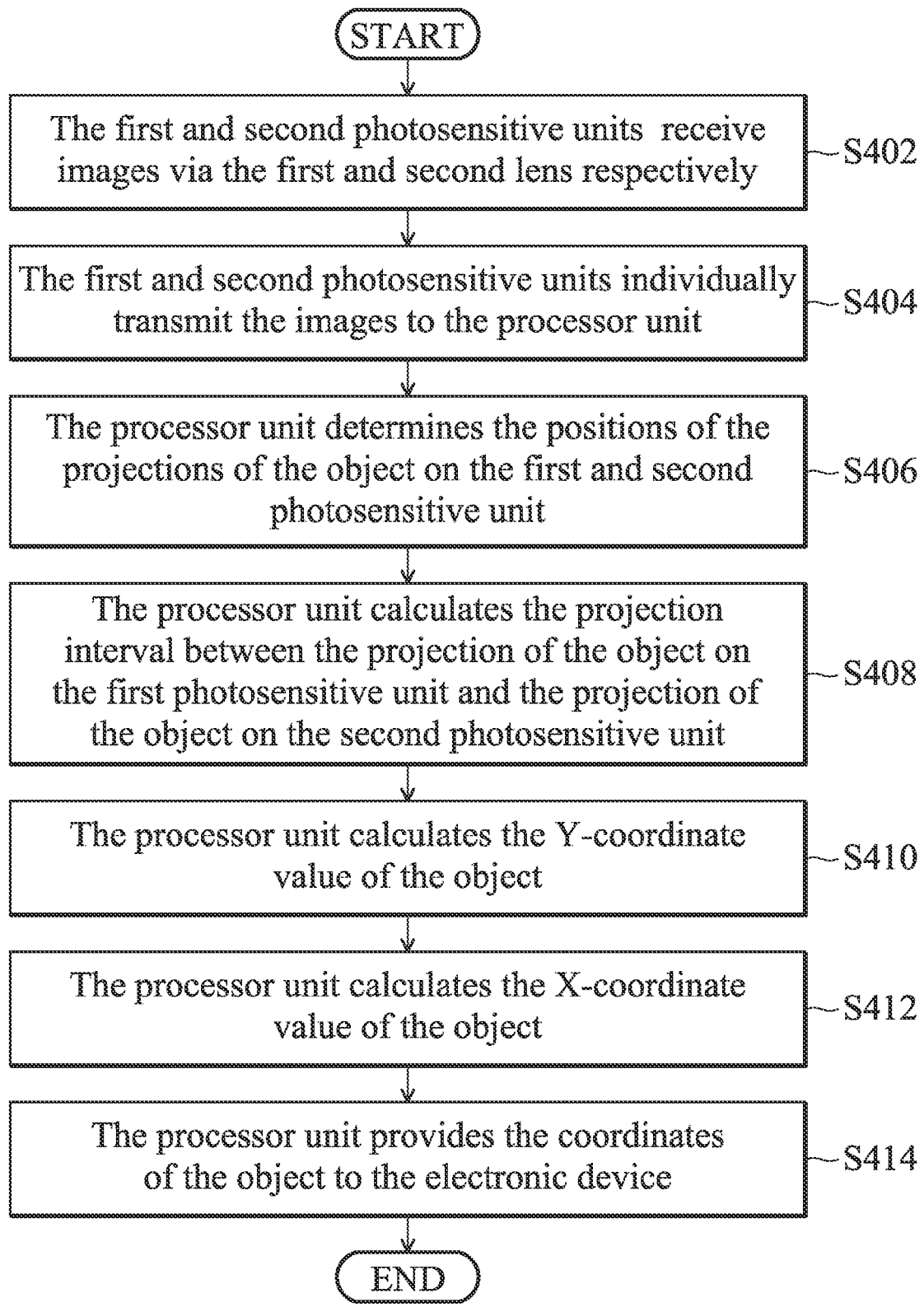
FIG. 4 is a flowchart of an embodiment of a method for the virtual control device shown in FIG. 1.

FIG. 4 is a flowchart of an embodiment of a method for the virtual control device shown in FIG. 1. In step S402, the photosensitive unit 104a receives the image $i_a$ via the lens 102a, and the photosensitive unit 104b receives the image $i_b$ via the lens 102b. Next, in step S404, the photosensitive unit 104a and the photosensitive unit 104b individually transmit the image $i_a$ and image $i_b$ to the processor unit 106.

In step S406, the processor unit 106 determines the position of the projection O' of the object O on the photosensitive unit 104a by comparing the pre-stored projection image of the object O with the block Aa on the image $i_a$. Similarly, the processor unit 106 determines the position of the projection O" of the object O on the photosensitive unit 104b by comparing the pre-stored projection image of the object O with a block on the image $i_b$.

In step S408, the processor unit 106 determines the projection interval $d_s$ according to the positions of the projection O' of the object O on the photosensitive unit 104a and the positions of the projection O" of the photosensitive unit 104b. Next, in step S410, the processor unit 106 calculates the object distance $d_O$ according to the projection interval $d_S$, the lens interval $d_L$ and the focal length $d_f$, and obtains a Y-coordinate value according to the difference between the object distance $d_O$ and a preset origin point.

In step S412, the processor unit 106 determines the distance $d_{X2}$ between the projection of the object O on the plane (on which the lens 102a and the lens 102b are arranged) and the projection of the lens-center $C_a$ on the photosensitive unit 104a according the distance $d_{X1}$, the focal length $d_f$ and the object distance $d_O$, and then the processor unit 106 obtains an X-coordinate value according to the difference between the distance $d_{X2}$ and the preset origin point. Finally, in step S414, the processor unit 106 provides the X-coordinate value and Y-coordinate value of the object O to the electronic device 200, and the electronic device 200 performs a corresponding operation according to the coordinate values.

In the other embodiment, before step S408, the processor unit 106 may determine whether the object O is on the virtual control plane V by comparing the projection O' of the object O with the projection V' on the image $i_a$. If the projection O' overlaps the projection V' on the image $i_a$, it means the object O is on the virtual control plane V for controlling, and then the method may proceed to step S408 for obtaining the coordinate values. On the other hand, if the projection O' does not overlap the projection V' on the image $i_a$, it means the object O is not on the virtual control plane V, so the calculation of the coordinate values can be omitted.

Based on the disclosure of the above description, the extension plane of the virtual control plane V intersects the center of the lens 102a and the center of the lens 102b, so the processor unit 106 can determine the position of the object O by processing only the image block nearby the projection of the virtual control plane V, and the computations required to operates is reduced. Also, because the projection of the virtual control plane V on the image $i_a$ is a straight line, the invention can determine whether the projection O' overlaps the projection V' to confirm whether the object O is in the virtual control plane V for controlling. Therefore, it can easy to determine whether a user (object O) operates a click operation or a select operation by the virtual control plane V. Furthermore, any plane in space, which has its extension plane intersecting the lens-center $C_a$ and the lens-center $C_b$, can be the virtual control plane V, and the processor unit 106 can adjust the position of the block for image computation operating in order to match the selected position of the virtual control plane V. For example, if the electronic device 200 is a notebook, the lens 102a, the lens 102b, the photosensitive unit 104a and the photosensitive unit 104b may be installed on the bottom of the display of the notebook, such that the images above the keyboard and images in front of the display can be obtained. Therefore, the virtual control plane V can be set in front of the display or above the keyboard according to the user's needs.

In some embodiments of the invention, the virtual control device can comprise more than two lenses and photosensitive units, and the processor unit can calculate more accurate coordinate values for the object accordingly. In some embodiments of the invention, the lens and photosensitive units can be performed by infrared sensor devices or other image-capturing devices.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A virtual control device for an electronic device, comprising:
    a first lens;
    a second lens;
    a first photosensitive unit, arranged behind the first lens by a focal length, and obtaining a first image via the first lens;
    a second photosensitive unit, arranged behind the second lens by the focal length, and obtaining a second image via the second lens; and
    a processor unit, determining the object-position coordinates of a virtual control plane according to the first image and the second image, and providing the object-position coordinates to the electronic device,
    wherein an extension plane of the virtual control plane intersects the center of the first lens and the center of the second lens, and the processor unit determines the object-position coordinates according to a first position of the projection of the object on the first photosensitive unit and a second position of the projection of the object on the second photosensitive unit, wherein the processor unit further obtains a projection interval between the first position and the second position, and calculates the object-position coordinates according to the projection interval.

2. The virtual control device of claim 1, wherein the center of the first lens and the center of the second lens are separated by a lens interval, the first lens and the second lens are arranged on a lens plane, and the processor unit obtains an object distance according to the lens interval, the projection interval and the focal length, and wherein the object distance is the interval between the object and the lens plane.

3. The virtual control device of claim 2, wherein the object distance is a multiplication product divided by the difference between the projection interval and the lens interval, and the focal length multiplied by the lens interval is the multiplication product.

4. The virtual control device of claim 2, wherein the object-position coordinates comprise a first-axis coordinate and a second-axis coordinate, and the processor unit determines the first-axis coordinate of the object-position coordinates according to the interval between a preset original point and the lens plane.

5. The virtual control device of claim 1, wherein the processor unit further obtains a lens-center projection interval between the first position and the projection of the center of the first lens on the photosensitive unit, and calculates the object coordinate according to the lens-center projection interval, and the projection interval.

6. The virtual control device of claim 5,
    wherein the center of the first lens and the center of the second lens are separated by a lens interval, the first lens and the second lens are arranged on a lens plane; and
    wherein the processor unit obtains an object distance according to the lens interval, the projection interval and the focal length.

7. The virtual control device of claim 6, wherein the processor unit obtains a lateral object distance according to the projection interval, the object interval and the focal length, wherein the lateral object distance is the interval between the projection of the center of the first lens on the first photosensitive unit and the projection of the object on the first photosensitive unit.

8. The virtual control device of claim 7, wherein the object-position coordinates comprise a first-axis coordinate and a second-axis coordinate, and the processor unit determines the second-axis coordinate of the object-position coordinates according to the lateral object distance and the lateral origin distance, and wherein the lateral origin distance is the interval between the projection of the center of the first lens on the first photosensitive unit and the projection of the object on the first photosensitive unit.

9. The virtual control device of claim 7, wherein the lateral object distance is equal to a multiplication product divided by the focal length, and the object distance multiplied by the lens-center projection interval is the multiplication product.

* * * * *